United States Patent [19]

Nilssen

[11] Patent Number: 4,727,470
[45] Date of Patent: Feb. 23, 1988

[54] RESONANT INVERTER HAVING CREST FACTOR CONTROL

[76] Inventor: Ole K. Nilssen, Caesar Dr., Rte. 5, Barrington, Ill. 60010

[21] Appl. No.: 917,788

[22] Filed: Oct. 10, 1986

[51] Int. Cl.⁴ .......................................... H02M 7/538
[52] U.S. Cl. ..................................... 363/132; 363/98; 315/DIG. 7
[58] Field of Search ................................ 323/249, 250; 315/DIG. 7; 363/17, 98, 132, 131, 136, 75

[56] References Cited

U.S. PATENT DOCUMENTS

| | | | |
|---|---|---|---|
| 3,624,405 | 11/1971 | Bishop et al. | 363/17 X |
| 4,277,728 | 7/1981 | Stevens | 315/DIG. 7 X |
| 4,333,134 | 6/1982 | Gurwicz | 363/98 X |
| 4,347,558 | 8/1982 | Kalinsky | 363/17 |
| 4,513,364 | 4/1985 | Nilssen | 363/132 |
| 4,520,255 | 5/1985 | Bredenkamp et al. | 363/132 X |
| 4,525,774 | 6/1985 | Kino et al. | 363/98 X |
| 4,626,983 | 12/1986 | Harada et al. | 363/98 X |

Primary Examiner—Patrick R. Salce
Assistant Examiner—Marc S. Hoff

[57] ABSTRACT

In a power-line-operated high-frequency electronic fluorescent lamp ballast, an inverter is powered from a DC supply voltage having a substantial amount of 120 Hz ripple. The fluorescent lamp is connected with the inverter's squarewave output voltage by way of a series-resonant L-C circuit. The amount of power supplied to the fluorescent lamp at any given moment depends on two significant factors: (i) the instantaneous magnitude of the DC supply voltage, and (ii) the instantaneous frequency of the inverter's squarewave output voltage. Arrangements are provided whereby the instantaneous inverter frequency is automatically adjusted over the duration of the 120 Hz ripple cycle such as to maintain the power supplied to the lamp substantially constant during this ripple cycle. As a result, in spite of a relatively large amount of ripple, the lamp current crest factor is maintained relatively low and substantially constant.

20 Claims, 3 Drawing Figures

RESONANT INVERTER HAVING CREST FACTOR CONTROL

BACKGROUND OF THE INVENTION

1. Field of Invention

The present invention relates to frequency-controlled inverters having tuned L-C output circuitry, particularly of a kind wherein control of frequency provides control of output power in such manner as to compensate for effects of variations in the magnitude of the DC supply voltage.

2. Elements of Prior Art

In conventional inverter-type power supplies, especially in connection with fluorescent lamp ballasts, in order to attain a low crest factor of the output current, it is necessary to power the inverters from a DC supply voltage having little or no ripple.

In many applications of power-line-operated inverter-type power supplies, in order to draw power from the power line with a relatively high power factor, it is necessary to permit the inverter's DC supply voltage to exhibit a relatively high degree of ripple.

Thus, in conventional power-line-operated inverter-type power supplies, especially in case of fluorescent lamp ballasts, there is a basic conflict between drawing power from the power line with a high power factor and at the same time providing an output current having a low crest factor.

To resolve this conflict, various forms of relatively complex power factor correction schemes are being used. These various power factor correction schemes function such as to cause power to be drawn from the power line with a relatively high power factor while at the same time providing a substantially constant-magnitude DC supply voltage.

SUMMARY OF THE INVENTION

Objects of the Invention

An object of the present invention is that of providing an improved controllable inverter-type power supply.

This, as well as other objects, features and advantages of the present invention will become apparent from the following description and claims.

BRIEF DESCRIPTION

In its basic preferred embodiment, the present invention constitutes a power-line-operated inverter-type power supply operable to power a fluorescent lamp. This power supply comprises:

(a) a full-bridge rectifier operative to connect with a 60Hz power line and to provide a full-wave-rectified DC supply voltage at a pair of DC terminals, the magnitude of this DC supply voltage exhibiting substantial variations at a fundamental frequency of 120 Hz;

(b) a half-bridge inverter connected with the DC terminals and operative to provide a squarewave output voltage at a pair of inverter terminals, the instantaneous magnitude of the squarewave output voltage being proportional to that of the DC supply voltage;

(c) a series-combination of an inductor and a capacitor connected across the inverter terminals, this series-combination being resonant at or near the frequency of the inverter's squarewave output voltage;

(d) a fluorescent lamp load effectively connected in parallel with the capacitor of the series-combination, the magnitude of the current provided to the lamp load being a function of the magnitude as well as of the frequency of the inverter's squarewave output voltage; and (e) frequency control means connected in circuit with the DC supply voltage as well as with the half-bridge inverter, the frequency control means being operative to vary the frequency of the inverter's squarewave output voltage as a function of the instantaneous magnitude of the DC supply voltage, thereby to cause the magnitude of the current provided to the lamp load to remain substantially constant in spite of significant variations in the instantaneous magnitude of the DC supply voltage.

The inverter is of a self-oscillating type and uses a saturable current transformer in the positive feedback loop. The saturation flux density of this saturable current transformer effectively determines the inversion frequency; and this saturation flux density is affected by a cross-magnetic flux. Inverter frequency control is attained by subjecting the saturable current transformer to a controlled degree of cross-magnetic flux. The cross-magnetic flux is provided by an adjacently positioned electro-magnet, the magnetizing current of which has an instantaneous magnitude functionally dependent upon the instantaneous magnitude of the DC supply voltage.

DESCRIPTION OF THE PREFERRED EMBODIMENT

Details of Construction

Figure 1:
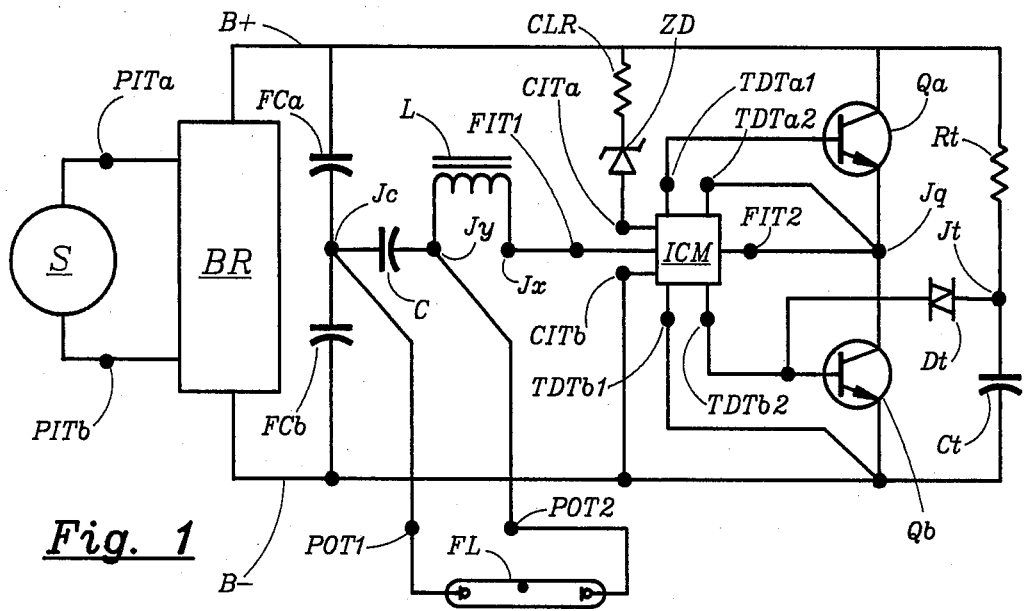
FIG. 1 provides a basic electrical circuit diagram of the preferred embodiment of the invention.

FIG. 1 schematically illustrates the electrical circuit arrangement of the preferred embodiment of the present invention.

In FIG. 1, a source S of ordinary 120 Volt/60 Hz power line voltage is applied to power input terminals PITa and PITb; which terminals, in turn, are connected with a bridge rectifier BR. The DC output from bridge rectifier BR is applied to a B+ bus and a B− bus, with the B+ bus being of positive polarity.

A first filter capacitor FCa is connected between the B+ bus and a junction Jc; and a second filter capacitor FCb is connected between junction Jc and the B− bus.

A first switching transistor Qa is connected with its collector to the B+ bus and with its emitter to a junction Jq.

A second switching transistor Qb is connected with its collector to junction Jq and with its emitter to the B− bus.

An inverter control means ICM has a pair of feedback input terminals FIT1 and FIT2, a first pair of transistor drive terminals TDTa1 and TDTa2, a second pair of transistor drive terminals TDTb1 and TDTb2, and a pair of control input terminals CITa and CITb.

Input terminals FIT1 and FIT2 are respectively connected with junction Jq and a junction Jx; transistor drive terminals TDTa1 and TDTa2 are respectively connected with the base and the emitter of transistor Qa; transistor drive terminals TDTb1 and TDTb2 are respectively connected with the emitter and the base of transistor Qb; and control input terminals CITa and CITb are respectively connected with the anode of a Zener diode ZD and the B− bus.

The cathode of Zener diode ZD is connected with the B+ bus by way of a current-limiting resistor CLR.

A capacitor C is connected between junction Jc and a junction Jy; and an inductor L is connected between junctions Jy and Jx. Junctions Jc and Jy are respectively connected with power output terminals POT1 and POT2; across which output terminals is connected a fluorescent lamp FL.

A resistor Rt is connected between the B+ bus and a junction Jt; a capacitor Ct is connected between junction Jt and the B− bus; and a Diac Dt is connected between junction Jt and the base of transistor Qb.

Figure 2:
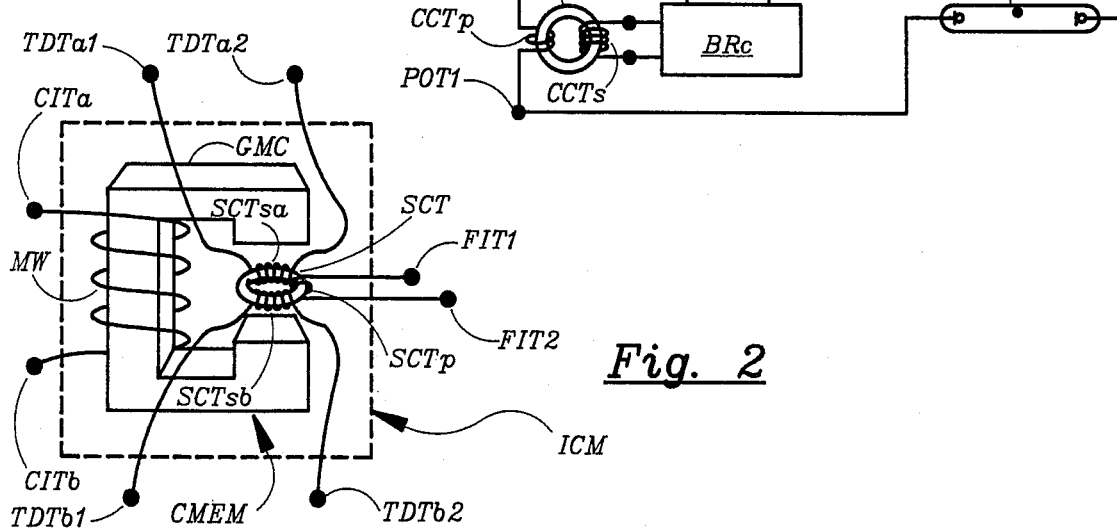
FIG. 2 provides a detailed view of the frequency control means, including the saturable current feedback transformer and the adjacently positioned cross-magnetizing electro-magnet.

FIG. 2 provides details of inverter control means ICM.

In FIG. 2, a saturable current transformer SCT has: (i) a primary winding SCTp connected between feedback input terminals FIT1 and FIT2, (ii) a first secondary winding SCTsa connected between the first pair of transistor drive terminals TDTa1 and TDTa2, and (iii) a second secondary winding SCTsb connected between the second pair of transistor drive terminals TDTb1 and TDTb2.

A cross-magnetizing electro-magnet CMEM has a gapped magnetic core GMC; and a saturable current transformer SCT is positioned within the gap thereof.

Gapped magnetic core GMC has a magnetizing winding MW, the terminals of which are connected between control input terminals CITa and CITb.

Figure 3:
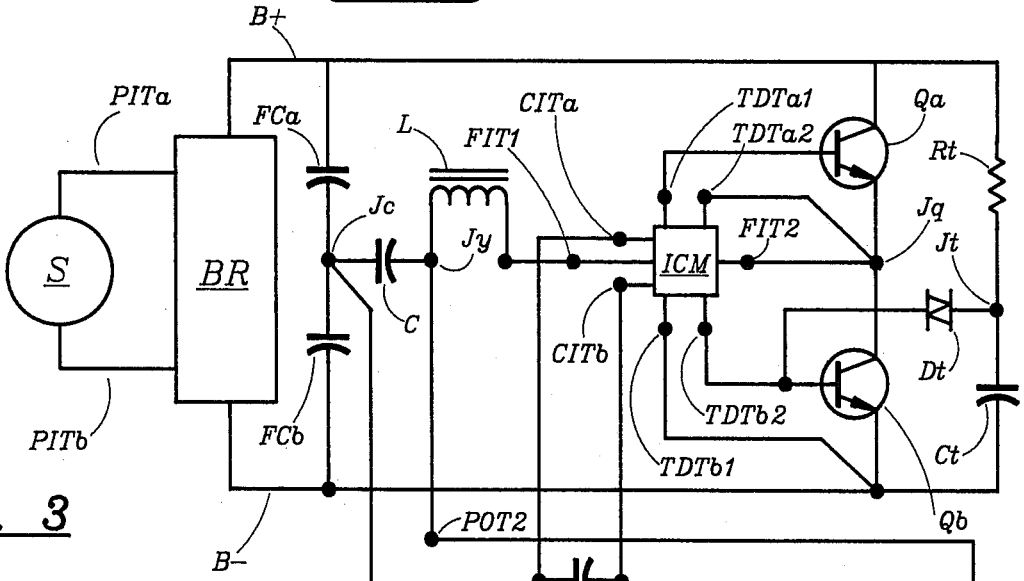
FIG. 3 provides a basic electrical circuit diagram of an alternative embodiment of the invention.

FIG. 3 schematically illustrates an alternative version of the present invention. The circuit of FIG. 3. is identical to that of FIG. 1 except as follows.

Instead of being connected between the B− bus and the anode of Zener diode ZD, control input terminals CITa and CITb of inverter control means ICM are connected with the output terminals of a bridge rectifier BRc, across which output terminals is also connected a filter capacitor Cc. The input terminals of bridge rectifier BRc are connected with secondary winding CCTs of control current transformer CCT. Primary winding CCTp of control current transformer CCT is connected between junction Jc and power output terminal POT1.

DETAILS OF OPERATION

The operation of the half-bridge inverter of FIG. 1 is conventional and is explained in conjunction with FIG. 8. of U.S. Pat. No. Re. 31,758 to Nilssen. However, as indicated in FIG. 2, only a single saturable current feedback transformer is used instead of the two saturable current feedback transformers shown in Nilssen's FIG. 8. The resulting difference in operation is of no consequence in connection with the present invention.

For a given magnitude of the DC supply voltage, due to the effect of the L-C circuit, the magnitude of the current provided to the fluorescent lamp is a sensitive function of the inverter's oscillating frequency. In turn, this oscillating frequency is sensitively dependent on the magnetic flux saturation characteristics of the magnetic core of the saturable current transformer SCT; which saturable current transformer is used in the positive feedback circuit of the self-oscillating inverter.

Details in respect to the effect of the magnetic flux saturation characteristics on the inverter's oscillation frequency are provided in U.S. Pat. No. 4,513,364 to Nilssen.

Specifically, as the saturation flux density of the saturable current transformer is reduced, the inverter's oscillation frequency increases.

One way of reducing the transformer's saturation flux density is that of increasing the temperature of the ferrite magnetic core used in that transformer; which effect is further explained in U.S. Pat. No. 4,513,364 to Nilssen.

Another way of reducing the transformer's saturation flux density is that of subjecting the transformer's ferrite magnetic core to a cross-magnetizing flux, such as from an adjacently placed permanent magnet or electro-magnet. That way, the saturation flux density of the transformer's ferrite magnetic core decreases with increasing cross-magnetizing flux.

Thus, in view of FIGS. 1 and 2, it is clear that: (i) the higher be the magnitude of the current provided to control input terminals CITa/CITb, (ii) the higher be the resulting cross-magnetizing field produced by the electro-magnet, (iii) the more reduction there be in the saturation flux density of the current transformer's ferrite magnetic core, (iv) the higher be the inverter's oscillation frequency, and (v) the lower be the magnitude of the current provided to the fluorescent lamp.

In other words: the more current provided to control input terminals CITa/CITb, the less power provided to the fluorescent lamp.

The magnitude of the current provided to the control input terminals CITa/CITb is a function of the magnitude of the DC supply voltage. As long as this magnitude exceeds the Zener voltage of Zener diode Zd, current is being supplied to the control input terminals CITa/CITb.

The Zener voltage is chosen to be somewhat lower than the minimum instantaneous magnitude of the DC supply voltage.

Thus, as variations occur in the magnitude of the DC supply voltage present between the B+ bus and the B− bus, corresponding variations occur in the magnitude of the current provided to the control input terminals CITa/CITb; which means that the magnitude of the current provided to the fluorescent lamp will not fall as much as it would have for a given reduction in the magnitude of the DC supply voltage.

In fact, with careful choice of magnetic geometries (such as the profile of the gap in the elctro-magnet) and non-linear impedance means (such as the Zener diode), it is possible to arrange for a situation where the magnitude of the lamp current remains substantially constant in spite of relatively large variations in the magnitude of the DC supply voltage.

In the circuit arrangement of FIG. 3, the lamp current is rectified, filtered, and used as current for the magnetizing winding MW of the cross-magnetizing electro-magnet CMEM. That way, a negative feedback situation is developed: an increase in the magnitude of the DC supply voltage gives rise to an increase in the magnitude of the lamp current; but the increase in the magnitude of the lamp current is automatically reduced by the effect on the magnitude of the current provided to the cross-magnetizing electro-magnet.

ADDITIONAL COMMENTS (a) One important implication of controlling the magnitude of the lamp current in obverse relationship with the magnitude of the DC supply voltage, is that of attaining a substantially lower lamp current rest factor as compared with the situation that would have existed when not so controlling the lamp current magnitude.

(b) Another important implication of controlling the magnitude of the lamp current is that of being able to control the waveshape of the current drawn by the inverter power supply from the power line.

(c) Detailed information relative to a fluorescent lamp ballast wherein the fluorescent lamp is powered by way of a series-excited parallel-loaded L-C resonant circuit is provided in U.S. Pat. No. 4,554,487 to Nilssen.

One effect of such a ballasting arrangement is that of making the waveshape of the voltage provided across the output to the fluorescent lamps very nearly sinusoidal, even though the output from the inverter itself, at the input to the series-resonant L-C circuit, is basically a squarewave.

(d) The circuit arrangements of FIGS. 1 and 3 are applicable to various loads and for various reasons.

For instance, regardless of the type of load used, the arrangement disclosed can be used to regulate power output against variations in the magnitude of the power line voltage.

Or, in case of the load being a rectifier means and a storage battery requiring to be charged, the frequency control means can be used to provide the required tapering of the charging current.

(e) When no current is provided to control input terminals CITa/CITb, the half-bridge inverter self-oscillates at a base frequency of about 30 kHz. Then, as current is provided to the control input terminals, the inverter's oscillation frequency increases, but not any higher than to twice the base frequency.

(f) The instantaneous peak-to-peak magnitude of the squarewave voltage provided by the half-bridge inverter between junctions Jq and JC is substantially equal to the instantaneous magnitude of the DC supply voltage; which is to say that the inverter's squarewave output voltage has a peak magnitude substantially equal to half the magnitude of the DC supply voltage.

(g) During at least part of each half-cycle of the 120 Volt/60 Hz power line input voltage, the instantaneous absolute magnitude of the DC supply voltage is subtantially equal to that of the power line input voltage.

(h) Saturable current transformer SCT requires only a miniscule Volt-Ampere input and the voltage-drop across its primary winding is only a small fraction of one Volt. Hence, the magnitude of the voltage-drop between junctions Jq and Jx is substantially negligible, and the inverter's output voltage is therefore effectively provided between junctions Jx and Jc; which means that the inverter's full squarewave output voltage is provided across the series L-C circuit.

(i) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

What is claimed is:

1. In an inverter powered from a DC supply voltage, the inverter providing a squarewave output voltage at a pair of output terminals, a series-combination of an inductor and a capacitor being connected across the output terminals, a load means being effectively connected in parallel with the capacitor, the squarewave output voltage having a first frequency, the instantaneous magnitude of the DC supply voltage varying periodically at a second frequency, the second frequency being substantially lower than the first frequency, the improvement comprising:

control means connected in circuit both with the inverter and with the source of DC supply voltage and operative to cause the first frequency to vary in synchronism with the instantaneous magnitude of the DC supply voltage.

2. The improvement of claim 1 wherein the inverter is made to self-oscillate by way of positive feedback means operative to provide positive feedback derived from the current flowing from the inverter's output terminals.

3. The improvement of claim 2 wherein the positive feedback means comprises saturable reactor means.

4. The improvement of claim 3 wherein the saturable reactor means has a magnetic core and wherein the magnetic saturation flux characteristic of this magnetic core is operative, at least in part, to determine the first frequency.

5. The improvement of claim 4 and means by which to electrically control the magnetic saturation flux characteristic.

6. The improvement of claim 5 and means operative to control the magnetic saturation flux characteristic in such manner as to cause the magnitude of the current flowing from the inverter's output terminals to maintain a relatively constant magnitude irrespective of variations in the instantaneous magnitude of the DC supply voltage.

7. The improvement of claim 1 wherein the load means comprises gas discharge lamp means.

8. The improvement of claim 1 wherein the DC supply voltage is obtained by full-wave rectification of the power line voltage provided by an ordinary electric utility power line and where the instantaneous absolute magnitude of the DC supply voltage is approximately equal to that of the power line voltage.

9. In an inverter-type power supply powered from a DC supply voltage, the power supply being operative to provide a substantially sinusoidal AC output voltage at a pair of output terminals, a load means being connected with the output terminals and receiving AC current therefrom, the magnitude of the DC supply voltage varying from time-to-time, the magnitude of the AC current provided to the load means being dependent upon the frequency of the AC voltage as well as upon the magnitude of the DC supply voltage, the improvement comprising:

control means connected in circuit with the power supply and the source of DC supply voltage, the control means having control input means and being operative in response to a control signal provided to the control input means to cause the frequency of the AC voltage to vary in response the magnitude of the DC supply voltage.

10. The improvement of claim 9 wherein the control means comprises saturable inductor means operative, at least in part, to determine the frequency of the AC voltage.

11. The improvement of claim 9 wherein the frequency of the AC voltage is controlled in such manner as to cause the magnitude of the AC current to remain approximately constant irrespective of substantial variations in the magnitude of the DC supply voltage.

12. The improvement of claim 9 wherein the AC current provided from the output terminals is manifestly limited in magnitude and wherein the load means comprises gas discharge lamp means.

13. The improvement of claim 9 wherein: (i) the DC supply voltage is obtained by rectification of the power line voltage provided by an ordinary electric utility power line, (ii) the magnitude of the DC supply voltage varies at a frequency equal to a whole multiple of the frequency of the power line voltage, and (iii) the frequency of the AC voltage is substantially higher than the frequency of the power line voltage.

14. An arrangement comprising:
rectifier means operative to connect with the AC voltage on an ordinary electric utility power line and to provide a DC supply voltage at a pair of DC terminals, the magnitude of the DC supply voltage varying synchronously with the instantaneous absolute magnitude of the AC voltage;
inverter means connected with the DC terminals and operative to convert the DC supply voltage to a squarewave voltage having an instantaneous absolute magnitude proportional to that of the DC supply voltage and being provided at a squarewave output, the inverter means having control input means and being operative in response to a control signal provided thereto to change the frequency of the squarewave voltage;
frequency-responsive circuit means connected with the squarewave output and operative to provide a substantially sinusoidal voltage at a pair of output terminals;
load means connected with the output terminals and operative to receive a load current therefrom, the magnitude of the load current being a function of the magnitude of the DC supply voltage as well as of the frequency of the squarewave voltage; and
sensor means responsive to the instantaneous magnitude of the DC supply voltage and operative to provide said control signal, thereby to effect adjustment of the frequency of the squarewave voltage such that the magnitude of the load current remains relatively constant irrespective of the variations in the magnitude of the DC supply voltage.

15. The arrangement of claim 14 wherein the inverter comprises positive feedback means and is disposed to self-oscillation by way of this positive feedback means, the frequency of the squarewave voltage being at least in part determined by the characteristics of the positive feedback means.

16. The arrangement of claim 15 wherein the positive feedback means comprises saturable inductor means operative at least in part to determine the frequency of the squarewave voltage.

17. The arrangement of claim 16 wherein the control means is magnetically coupled with the saturable inductor means and operative to affect its saturation characteristics, thereby to affect the frequency of the squarewave voltage.

18. An arrangement comprising:
a source having control input means and being operative to provide an AC voltage across a pair of AC terminals, the magnitude of the AC voltage exhibiting periodic variations, the frequency of the AC voltage being adjustable above a certain base frequency in response to a control signal received at the control input means;
a series-combination of an inductor and a capacitor connected across the AC terminals, the series-combination being resonant at or near the base frequency and having a pair of output terminals effectively parallel-connected with the capacitor;
load means connected with the output terminals and operative to receive a load current therefrom, the magnitude of the load current being a function of the magnitude as well as the frequency of the AC voltage; and
sensor means responsive to the magnitude of the AC voltage and operative to provide said control signal, thereby to effect adjustment of the frequency of the AC voltage such that the magnitude of the load current remains relatively constant irrespective of the periodic variations in the magnitude of the AC voltage.

19. The arrangement of claim 18 wherein the frequency of said periodic variations is on the order of 120 Hz and wherein the base frequency is on the order of 30 kHz.

20. The arrangement of claim 18 wherein the load current has a crest factor and wherein the crest factor is substantially reduced by virtue of the action of the control means.

* * * * *

REEXAMINATION CERTIFICATE (1731st)

United States Patent [19]

Nilssen

[11] B1 4,727,470

[45] Certificate Issued Jun. 30, 1992

[54] RESONANT INVERTER HAVING CREST FACTOR CONTROL

[76] Inventor: Ole K. Nilssen, Caesar Dr., Rte. 5, Barrington, Ill. 60010

Reexamination Request:
No. 90/002,097, Jul. 27, 1990

Reexamination Certificate for:
| | |
|---|---|
| Patent No.: | 4,727,470 |
| Issued: | Feb. 23, 1988 |
| Appl. No.: | 917,788 |
| Filed: | Oct. 10, 1986 |

[51] Int. Cl.⁵ ............................................. H02M 7/538
[52] U.S. Cl. ................................. 363/132; 315/DIG. 7; 363/98
[58] Field of Search .................... 363/37; 331/183, 186; 323/302; 315/284, 226, 307, 311

[56] References Cited

U.S. PATENT DOCUMENTS

| | | | |
|---|---|---|---|
| Re. 31,758 | 12/1984 | Nilssen | 331/113 |
| Re. 32,155 | 5/1986 | Nilssen | 363/18 |
| 2,194,180 | 3/1940 | de La Sabloniere | 333/32 |
| 3,026,486 | 3/1962 | Pintell | 331/113 |
| 3,084,283 | 4/1963 | Grunwaldt | 315/205 |
| 3,133,256 | 5/1964 | Denelsbeck et al. | 331/113 A |
| 3,320,510 | 5/1967 | Locklair | 363/22 |
| 3,373,314 | 3/1968 | Nilssen | 315/214 |
| 3,611,021 | 10/1971 | Wallace | 315/307 |
| 4,277,726 | 7/1981 | Burke | 315/98 |
| 4,353,112 | 10/1982 | Rietveld et al. | 363/16 |
| 4,415,839 | 11/1983 | Lesea | 315/308 |
| 4,503,363 | 3/1985 | Nilssen | 315/307 |
| 4,513,364 | 4/1985 | Nilssen | 363/132 |
| 4,593,167 | 6/1986 | Nilssen | 219/10.55 B |
| 4,723,098 | 2/1988 | Grubbs | 363/37 |
| 4,819,146 | 4/1989 | Nilssen | 363/132 |
| 4,851,739 | 7/1989 | Nilssen | ·363/132 |
| 4,862,040 | 8/1989 | Nilssen | 363/132 |
| 4,873,471 | 10/1989 | Dean et al. | 315/308 |
| 4,887,201 | 12/1989 | Nilssen | 363/132 |

FOREIGN PATENT DOCUMENTS

| | | | |
|---|---|---|---|
| 3338464 | 5/1985 | Fed. Rep. of Germany | 363/37 |
| 2555374 | 5/1985 | France | 363/37 |

*Primary Examiner*—William H. Beha, Jr.

[57] ABSTRACT

In a power-line-operated high-frequency electronic fluorescent lamp ballast, an inverter is powered from a DC supply voltage having a substantial amount of 120 Hz ripple. The fluorescent lamp is connected with the inverter's squarewave output voltage by way of a series-resonant L-C circuit. The amount of power supplied to the fluorescent lamp at any given moment depends on two significant factors: (i) the instantaneous magnitude of the DC supply voltage, and (ii) the instantaneous frequency of the inverter's squarewave output voltage. Arrangements are provided whereby the instantaneous inverter frequency is automatically adjusted over the duration of the 120 Hz ripple cycle such as to maintain the power supplied to the lamp substantially constant during this ripple cycle. As a result, in spite of a relatively large amount of ripple, the lamp current crest factor is maintained relatively low and substantially constant.

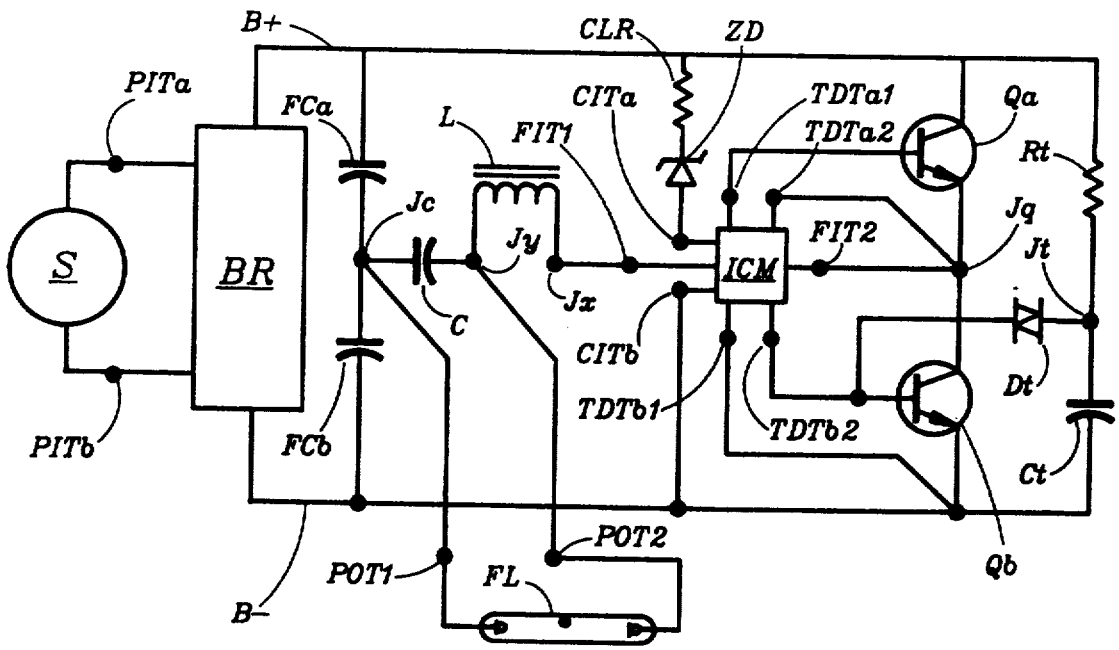

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *